US009735612B2

(12) United States Patent
Sheldon

(10) Patent No.: US 9,735,612 B2
(45) Date of Patent: Aug. 15, 2017

(54) REMOTELY POWERED RECONFIGURABLE RECEIVER FOR EXTREME SENSING PLATFORMS

(75) Inventor: Douglas J. Sheldon, Valencia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1176 days.

(21) Appl. No.: 13/281,331

(22) Filed: Oct. 25, 2011

(65) Prior Publication Data

US 2012/0098645 A1    Apr. 26, 2012

Related U.S. Application Data

(60) Provisional application No. 61/406,469, filed on Oct. 25, 2010.

(51) Int. Cl.
*G06K 7/01*    (2006.01)
*H02J 7/34*    (2006.01)
*H02J 17/00*   (2006.01)

(52) U.S. Cl.
CPC .............. *H02J 7/345* (2013.01); *H02J 17/00* (2013.01); *Y10S 901/01* (2013.01); *Y10S 901/46* (2013.01)

(58) Field of Classification Search
CPC ......... H02J 17/00; H02J 7/345; Y10S 901/01; Y10S 901/46; B64G 1/16; B64G 1/66; B64G 4/00
USPC ......................................... 340/10.1; 361/276
See application file for complete search history.

(56) References Cited

U.S. PATENT DOCUMENTS

| | | | | |
|---|---|---|---|---|
| 6,373,222 B2 * | 4/2002 | Odaohhara | ................... | 320/116 |
| 7,126,810 B1 * | 10/2006 | Mueller et al. | ............... | 361/328 |
| 7,239,206 B2 * | 7/2007 | D'Amore | ...................... | 330/297 |
| 7,400,911 B2 * | 7/2008 | Planning et al. | ............. | 455/572 |
| 7,460,845 B2 * | 12/2008 | Kottschlag et al. | .......... | 455/132 |
| 7,583,212 B2 * | 9/2009 | Khorram | ...................... | 341/126 |
| 7,612,985 B2 * | 11/2009 | Dementiev et al. | .......... | 361/502 |
| 8,552,597 B2 * | 10/2013 | Song et al. | ................... | 307/149 |

(Continued)

OTHER PUBLICATIONS

Drew, "Energy Harvester Produces Power from Local Environment, Eliminating Batteries in Wireless Sensors", Linear Technology Corporation Design Note 483 (2010), pp. 1-2.

(Continued)

*Primary Examiner* — Yong Hang Jiang
(74) *Attorney, Agent, or Firm* — KPPB LLP

(57) ABSTRACT

Unmanned space programs are currently used to enable scientists to explore and research the furthest reaches of outer space. Systems and methods for low power communication devices in accordance with embodiments of the invention are disclosed, describing a wide variety of low power communication devices capable of remotely collecting, processing, and transmitting data from outer space in order to further mankind's goal of exploring the cosmos. Many embodiments of the invention include a Flash-based FPGA, an energy-harvesting power supply module, a sensor module, and a radio module. By utilizing technologies that withstand the harsh environment of outer space, more reliable low power communication devices can be deployed, enhancing the quality and longevity of the low power communication devices, enabling more data to be gathered and aiding in the exploration of outer space.

22 Claims, 7 Drawing Sheets

(56) References Cited

U.S. PATENT DOCUMENTS

| | | | | |
|---|---|---|---|---|
| 2003/0234730 A1* | 12/2003 | Arms | ...................... | H02J 17/00 340/870.01 |
| 2010/0067331 A1* | 3/2010 | Yang | ...................... | H04B 11/00 367/134 |
| 2010/0091572 A1* | 4/2010 | Choi | ........................ | 365/185.18 |
| 2010/0102625 A1* | 4/2010 | Karimi et al. | ................. | 307/9.1 |
| 2010/0216410 A1* | 8/2010 | Liu et al. | ........................ | 455/73 |

OTHER PUBLICATIONS

Kuhn, et al., "A Microtransceiver for UHF Proximity Links Including Mars Surface-to-Orbit Applications", Proceedings of the IEEE, vol. 95, No. 10, Oct. 2007, pp. 2019-2044.

Sheldon, et al., "Cryogenic Operation of Field Programmable Gate Arrays", ReSpace / MAPLD 2011 Conference, pp. 1-19.

"MAX1674/MAX 1675/MAX 1676", High-Efficiency, Low-Supply-Current, Compact, Step-Up DC-DC Converters, Maxin Integrated, 2000, 12 pgs.

\* cited by examiner

REMOTELY POWERED RECONFIGURABLE RECEIVER FOR EXTREME SENSING PLATFORMS

CROSS-REFERENCE TO RELATED APPLICATIONS

The current application claims priority to U.S. Provisional Patent Application No. 61/406,469, filed Oct. 25, 2010, the disclosure of which is incorporated herein by reference.

FEDERAL FUNDING SUPPORT

The invention described herein was made in the performance of work under a NASA contract, and is subject to the provisions of Public Law 96-517 (35 U.S.C. §202) in which the Contractor has elected to retain title.

FIELD OF THE INVENTION

The present invention is directed, in general, to a remote sensor platform; more specifically to low power communication systems.

BACKGROUND OF THE INVENTION

Unmanned space programs have several advantages over manned space programs, including the ability to run for several years and travel millions of miles from Earth without the need for food and water. Many exciting programs, both in deep space and near Earth, are sponsored by the National Aeronautics and Space Administration's Jet Propulsion Laboratory in Pasadena, Calif. including the Explorer program, the Magellan probe, CloudSat, and several Mars exploration programs.

Included in the Mars exploration programs are the Spirit and Opportunity rovers which have been exploring the surface of Mars. These robotic explorers have provided invaluable insight into the conditions on Mars and have been providing information and opportunities for research and development for today and for the scientists of tomorrow. The surface of Mars contains many surface features that indicate that water may have once existed on Mars. The Spirit and Opportunity rovers have conducted many experiments and discovered microscopic deposits on the Martian surface that indicates water once existed. Additionally, the surface of Mars is very dry, with large dust storms and high winds. The dust storms cause the rovers to lose power, while the high winds clean the dust off the rovers and enable them to continue working.

A capacitor is an electrical device designed to store energy in an electric field. Although the construction of capacitors may vary, the basis of a capacitor is two electrical conductors separated by a dielectric. The capacitance of a capacitor is greatest when there is a narrow separation between large areas of the conductors. An ultracapacitor is similar to a capacitor except that an ultracapacitor does not have a conventional dielectric. Instead, an ultracapacitor uses virtual plates that are different layers of the same substrate. These thinner layers can hold a small voltage, so several virtual plates can be combined to achieve very high power densities. Ultracapacitors have very high rate of charge and discharge. Additionally, ultracapacitors are very efficient, discharging approximately 95% of the energy used to charge the ultracapacitor.

A field-programmable gate array (FPGA) is an integrated circuit that is designed to be configured by the user of the FPGA using a hardware description language. This is opposed to an application specific integrated circuit (ASIC), which is fixed at the time of manufacturing. FPGAs contain programmable logic component blocks, including functional blocks and memory blocks, that can be connected together via a hierarchy of reconfigurable interconnects. FPGAs can be constructed via different processes, including SRAM, PROM, EEPROM, Flash, and Fuse. FPGAs can also be coupled with analog elements, including analog-to-digital converters and digital-to-analog converters, allowing the FPGA to operate as a system-on-a-chip.

SUMMARY OF THE INVENTION

Low power communication devices and methods in accordance with embodiments of the invention are disclosed. In one embodiment of the invention, a low power communication device, includes processing circuitry implemented using a Flash FPGA, a radio module configured to transmit and receive data, and a power supply module configured to provide power to the processing circuitry and the radio module, wherein the power supply module contains an energy harvesting unit configured to harvest energy from the surrounding environment. In addition, the power required to operate the processing circuitry does not exceed the power generated by the power supply module.

In another embodiment of the invention, the power supply module includes a capacitor.

In an additional embodiment of the invention, the power supply module includes an ultracapacitor.

In yet another additional embodiment of the invention, the ultracapacitor is capable of operation at a temperature above −200 degrees Celsius.

In still yet another additional embodiment of the invention, the power supply module is configured to harvest photovoltaic energy.

In still another embodiment of the invention, the power supply module is configured to harvest piezoelectric energy.

In yet another embodiment of the invention, the power supply module is configured to harvest thermal gradient energy.

In still another embodiment again of the invention, the power supply module is configured to harvest RF energy.

In another further embodiment of the invention, the power supply includes a battery.

In still another additional embodiment of the invention, the battery is a Lithium-Ion battery.

In yet another embodiment again of the invention, the radio module is at least partially implemented using Silicon Germanium.

In still another embodiment of the invention, the radio module is implemented utilizing the processing circuitry.

In still yet another embodiment of the invention, the low power communication device contains a sensor module.

In an additional embodiment of the invention, the processing circuitry is any device configured to perform computations.

In still another embodiment of the invention, there are multiple processing circuits.

Yet another embodiment of the invention includes a plurality of low power communication devices. In addition, at least one of the low power communication devices comprises, processing circuitry implemented using a Flash FPGA, a radio module configured to transmit and receive data, a power supply module configured to provide power to the processing circuitry and the radio module, the power supply module contains an energy harvesting unit configured to harvest energy from the surrounding environment, wherein the power required to operate the processing circuitry does not exceed the power generated by the power supply module, and at least one of the low power communication devices is configured to communicate with a plurality of low power communication devices.

Still another embodiment of the invention includes harvesting energy from the local environment using an energy harvesting module, charging an ultracapacitor, where charging the ultracapacitor utilizes the harvested energy, powering a low power communications device that is at least partially implemented using a Flash FPGA, and transmitting data using the low power communications device.

Another embodiment of the invention also includes receiving data.

In still another embodiment of the invention, receiving data further includes receiving data using a sensor module.

In still yet another embodiment of the invention, receiving data further includes receiving data using a radio module.

Another embodiment of the invention also includes processing data.

In still another embodiment of the invention, processing data further includes power management of a processing circuit.

In yet another embodiment of the invention, transmission of data further includes power management of a radio module.

In still yet another embodiment of the invention, the energy harvesting occurs continuously.

In yet another embodiment of the invention, the energy harvesting occurs on demand.

DETAILED DESCRIPTION

Turning now to the drawings, low power communication devices in accordance with embodiments of the invention are illustrated. In many embodiments of the invention, the low power communication devices include a low power field-programmable gate array (FPGA). In a number of embodiments of the invention, the low power FPGA is Flash based. Flash is a form of solid state, non-volatile memory that is capable of being electrically reprogrammed. Flash stores information in an array of cells constructed using floating-gate transistors. In several embodiments of the invention, the low power communication devices include a power supply module. In many embodiments of the invention, the power supply module incorporates an ultracapacitor. In a number of embodiments of the invention, the power supply module incorporates an energy harvesting module configured to harvest energy from one or more sources. In several embodiments of the invention, the low power FPGA receives data from the sensor module. The low power FPGA can be configured to implement processing circuitry configured to perform calculations utilizing the data and to otherwise process the data for transmission to remote devices. In many embodiments of the invention, the low power communication device includes a radio module. In a number of embodiments of the invention, the radio module is implemented using the FPGA. In several embodiments of the invention, the low power FPGA uses the radio module to transmit data to remote systems. In a number of embodiments of the invention, the low power communication device harvests energy from the environment while receiving, processing, and transmitting data to other devices. Low power communication devices and processes in accordance with embodiments of the invention are discussed further below.

System Overview

Figure 1:
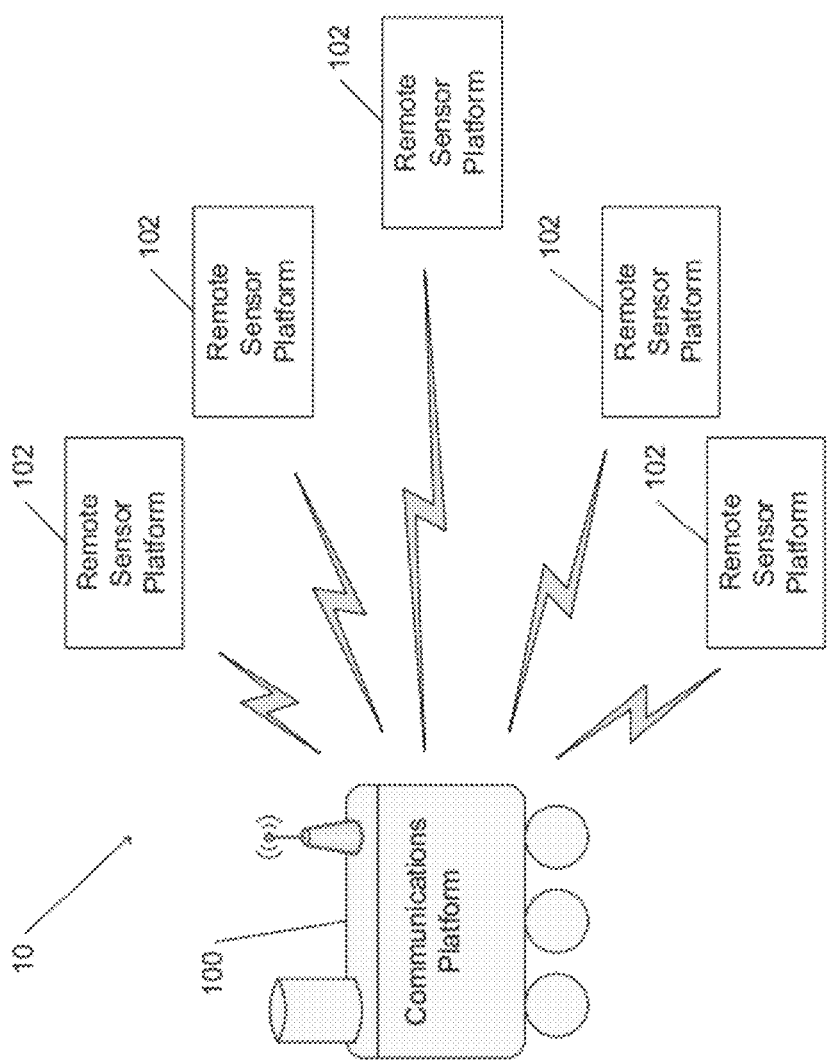
FIG. 1 is a diagram of a network of low power communication devices in accordance with an embodiment of the invention.

A low power communication device network in accordance with an embodiment of the invention is illustrated in FIG. 1. The illustrated low power communication device network 10 includes a communications platform 100 and a plurality of remote sensor platforms 102. The communications platform 100 and the remote sensor platforms 102 are both low power communication devices. In many embodiments of the invention, other low power communication devices are utilized. In the illustrated embodiment, the communications platform 100 is a vehicle capable of being remotely or autonomously navigated including but not limited to a Mars Exploration Rover. In many embodiments of the invention, the communications platform 100 can be any device capable of communicating with a remote sensor platform 102. As is discussed further below, the remote sensor platform 102 receives data and processes the received data. After processing, the remote sensor platform 102 can transmit the data to the communications platform 100. In many embodiments of the invention, the remote sensor platform 102 analyzes the collected data and transmits the data in response to the data satisfying one or more predetermined criteria. Many remote sensor platforms in accordance with embodiments of the invention include an energy harvesting module to harvest energy from the surrounding environment, including via solar harvesting, piezoelectric harvesting, or other energy harvesting means known to those of ordinary skill in the art.

Although a specific architecture of a low power communication device network is shown in FIG. 1, other implementations appropriate to a specific application can be utilized in accordance with embodiments of the invention including implementations that involve the transmission of data via wired and/or wireless links. Remote sensor platforms in accordance with embodiments of the invention and methods of operation of the remote sensor platforms are discussed further below.

Remote Sensor Platform

Figure 2:
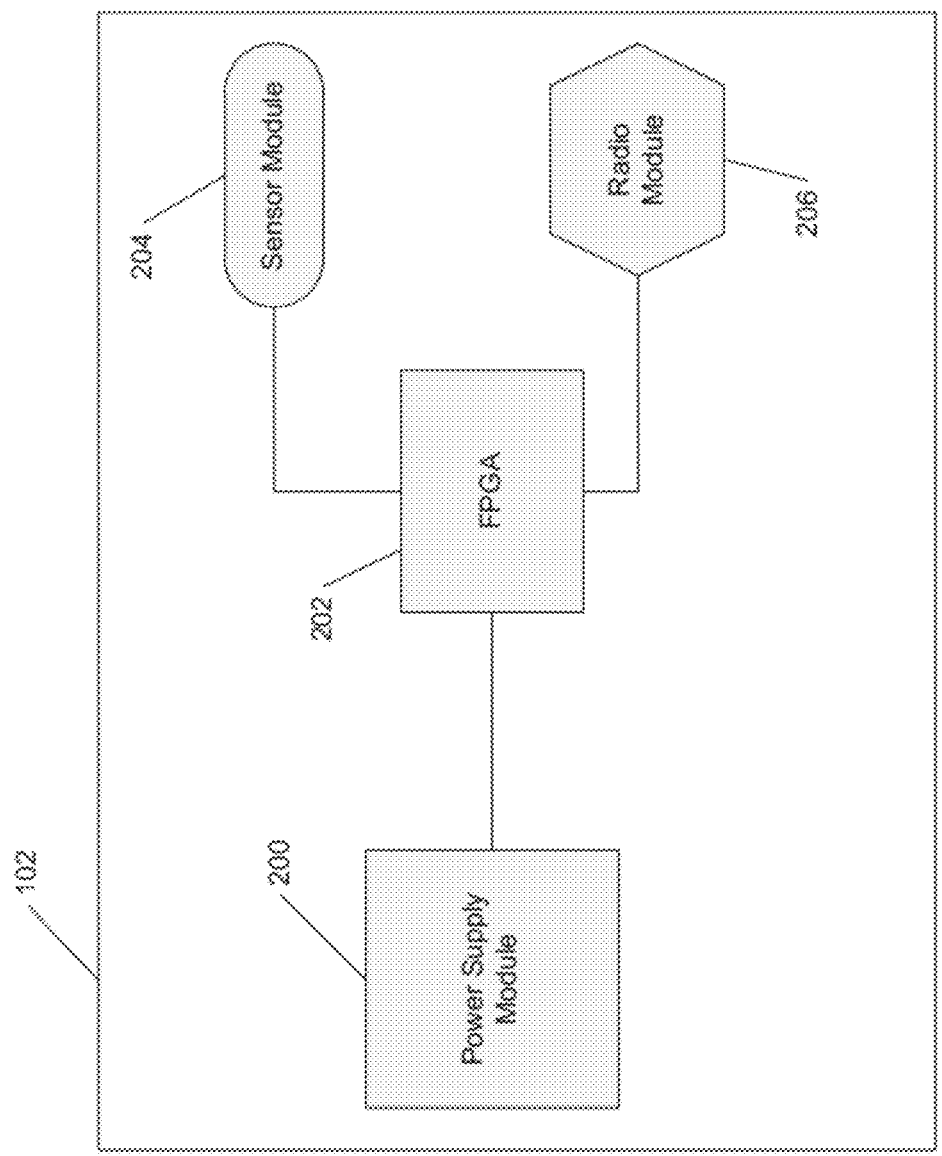
FIG. 2 is a diagram of a remote sensor platform in accordance with an embodiment of the invention.

A remote sensor platform is a device capable of detecting data in a location remote from a primary location and enabling the data to be retrieved from the remote sensor platform. A remote sensor platform in accordance with an embodiment of the invention is illustrated in FIG. 2. The remote sensor platform 102 includes a power supply module 200 that supplies power to a FPGA 202, a sensor module 204, and a radio module 206.

In the illustrated embodiment, the remote sensor platform includes a Flash-based FPGA 202. In several embodiments of the invention, the Flash-based FPGA 202 is implemented using 2 T Flash cells. 2 T Flash cells are capable of operating at comparatively low power compared to comparable SRAM-based CMOS technologies and is capable of withstanding the harsh environment of outer space. In other embodiments, a FPGA based on any manufacturing process or any other device capable of implementing the processes described can be utilized as is appropriate to a specific application. In the illustrated embodiment, the FPGA 202 receives data from the sensor module 204. The sensor module 204 can be configured to include one or more sensors that generate data concerning the surrounding environment. In many embodiments of the invention, the sensor module 204 can be reconfigured in the field.

The FPGA 202 can be configured to perform calculations utilizing the data received from the sensor module 204. In addition, the FPGA 202 can be configured to transmit data using the radio module 206. As discussed above, the radio module 206 can be implemented using the FPGA 202. In many embodiments of the invention, however, the radio module is implemented using Silicon Germanium (SiGe), as SiGe radio modules are particularly well suited for use in outer space. Although specific FPGA configurations are discussed above, any of a variety of low power and/or low temperature FPGA configurations can be utilized based upon the requirements of a specific application in accordance with embodiments of the invention.

Power Supply Module

Circuitry within a remote sensor platform in accordance with many embodiments of the invention receives power from a power supply module. The power supply module is designed to generate and provide a constant source of energy to power the remote sensor platform in a variety of environmental conditions. In a number of embodiments of the invention, the power supply module includes an energy harvesting module designed to harvest ambient energy from the environment surrounding the energy harvesting module. In many embodiments of the invention, the power supply module 200 includes an ultracapacitor designed to filler, store, and deliver the energy generated by the energy harvesting module 220. In several embodiments of the invention, the power supply module 200 includes a battery.

Figure 2A:
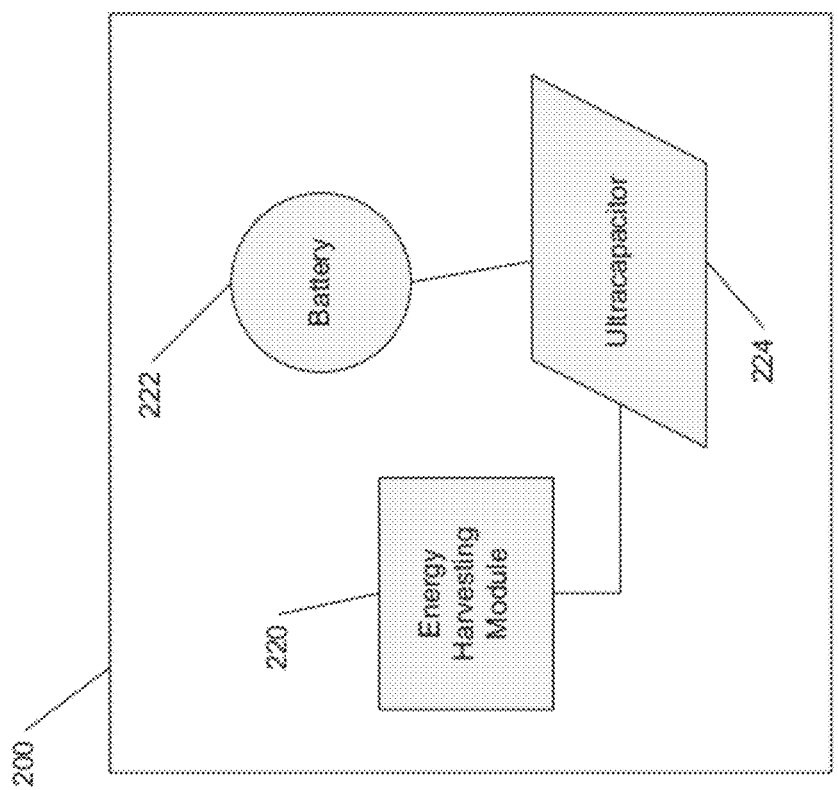
FIG. 2A is a diagram of a power supply module in accordance with an embodiment of the invention.

A power supply module in accordance with an embodiment of the invention is illustrated in FIG. 2A. The power supply module 200 includes an energy harvesting module 220, a battery 222, and an ultracapacitor 224. In many embodiments of the invention, the ultracapacitor 224 is capable of operation at temperatures above −200 degrees Celsius. In a number of embodiments, the ultracapacitor is capable of operation at temperatures above −120 degrees Celsius. In several embodiments of the invention, the ultracapacitor 224 is capable of operation at temperatures above −85 degrees Celsius. In many embodiments of the invention, the energy harvesting module 220 is a LTC3588-1 Energy Harvester manufactured by the Linear Technology Corporation of Milpitas, Calif. In many embodiments of the invention, the energy harvesting module 220 is capable of harvesting energy from the environment, including, but not limited to, solar panels, piezoelectric devices, RF energy transducers, and Seebeck devices. The energy harvesting module harvests energy by collecting energy from the surrounding environment, storing the energy, and converting the energy into a useful regulated voltage. In many embodiments of the invention, the energy harvesting module 220 provides energy to the ultracapacitor 224. The ultracapacitor 224 charges the battery 222 and powers the FPGA 202. In a number of embodiments of the invention, the energy harvesting module 220 charges the battery 222 directly. In many embodiments of the invention, the energy harvesting module 220 is used to recharge both the ultracapacitor 224 and the battery 222. In several embodiments of the invention, the battery 222 powers the ultracapacitor 224. In the absence of charge in the ultracapacitor, the battery 222 powers the FPGA 202.

In several embodiments of the invention, the battery is a Lithium-Ion battery. In many embodiments of the invention, the battery is any device capable of storing and delivering a charge to the FPGA. In many embodiments of the invention, the FPGA is powered by both the battery 222 and the ultracapacitor 224. In many embodiments of the invention it is desirable to have both a battery 222 and an ultracapacitor 224. As stated above, the ultracapacitor performs filtering of the energy generated by the energy harvesting module 220. The ultracapacitor 224 is capable of powering the remote sensor platform while energy is being harvested and excess energy is stored in the battery 222. In situations where the energy harvesting module 220 is unable to harvest energy, the battery 222 powers the remote sensor platform. In the event of an extended period where the energy harvesting module 220 is unable to harvest energy, the ultracapacitor 224 may become fully discharged and the battery 222 stores sufficient energy to power the remote sensor platform until the environmental conditions improve and the energy harvesting module 220 resumes harvesting energy. In several embodiments of the invention, the ultracapacitor 224 may be designed to have superior low temperature performance relative to the battery 222; in such a case it is preferable to power the remote sensor platform using the ultracapacitor 224. Lithium-Ion batteries can also have poor low temperature performance. For example, the charge delivered by a Lithium-Ion battery at low temperatures can be substantially lower than the amount of charge delivered at room temperature. By utilizing the ultracapacitor to deliver charge to the processing circuitry, the limitations placed upon low power communication systems by Lithium-Ion batteries at low temperatures can be avoided.

Although a specific architecture of a remote sensor platform is shown in FIG. 2 and a specific architecture of a power supply module is shown in FIG. 2A, other implementations appropriate to a specific application can be utilized in accordance with embodiments of the invention including remote sensor platforms having power supplies that do not include an ultracapacitor and/or do not include a battery. Methods of operation of the remote sensor platform are discussed further below.

Remote Sensor Platform Operation

Figure 3:
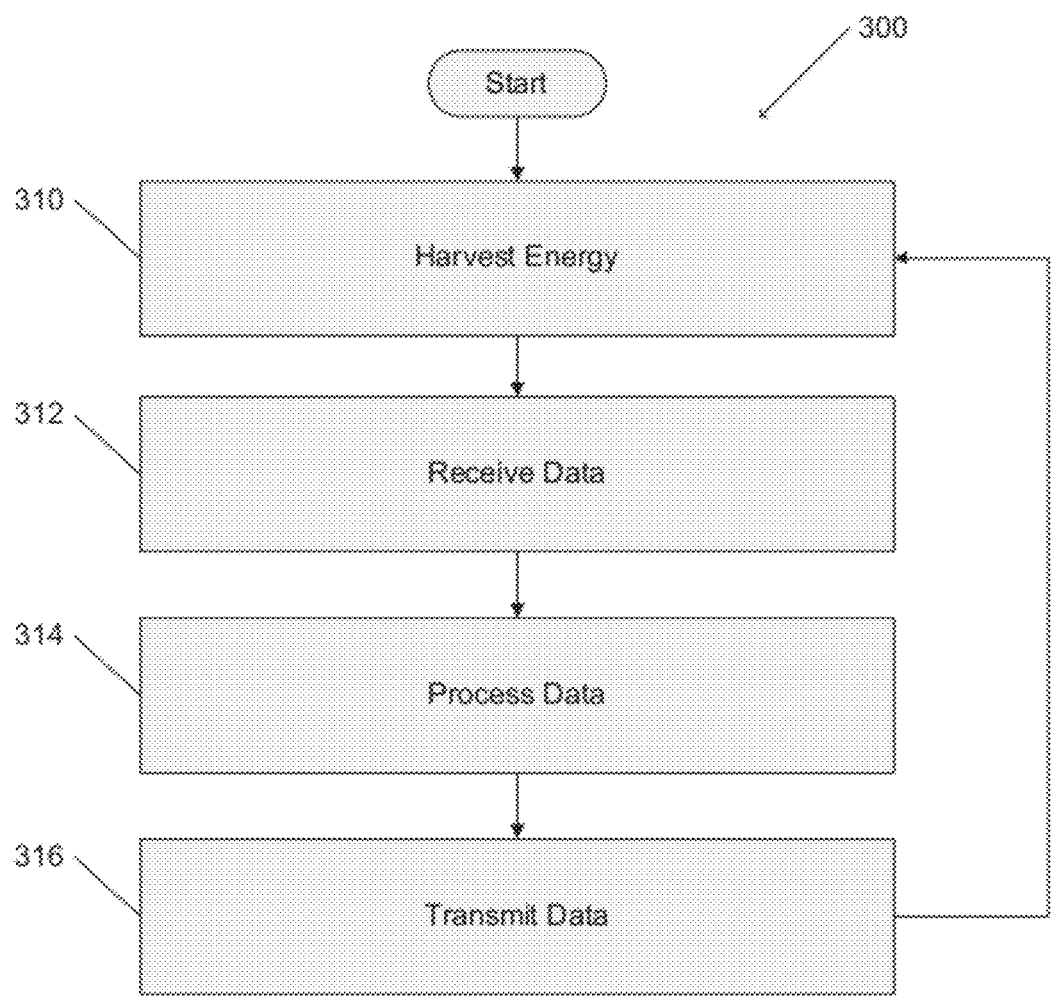
FIG. 3 is a flow chart illustrating a process for operating a remote sensor platform in accordance with an embodiment of the invention.

In operation, a remote sensor platform is capable of receiving, processing, and transmitting data. A process for operating a remote sensor platform in accordance with an embodiment of the invention is illustrated in FIG. 3. The method of operation for a remote sensor platform 300 includes harvesting (310) energy to support the ongoing operation of the remote sensor platform. The remote sensor platform can receive (312) data, process (314) data, and communicate (316) with other devices.

Although a specific method for a remote sensor platform involving harvesting energy, receiving data, processing data, and communicating with other devices is shown in FIG. 3, other implementations appropriate to a specific application can be utilized in accordance with embodiments of the invention. For example, the processes illustrated in FIG. 3 can be performed sequentially, independently, and/or in parallel. Processes for harvesting energy, receiving data, and transmitting data in accordance with embodiments of the invention are discussed further below.

Energy Harvesting

Figure 4:
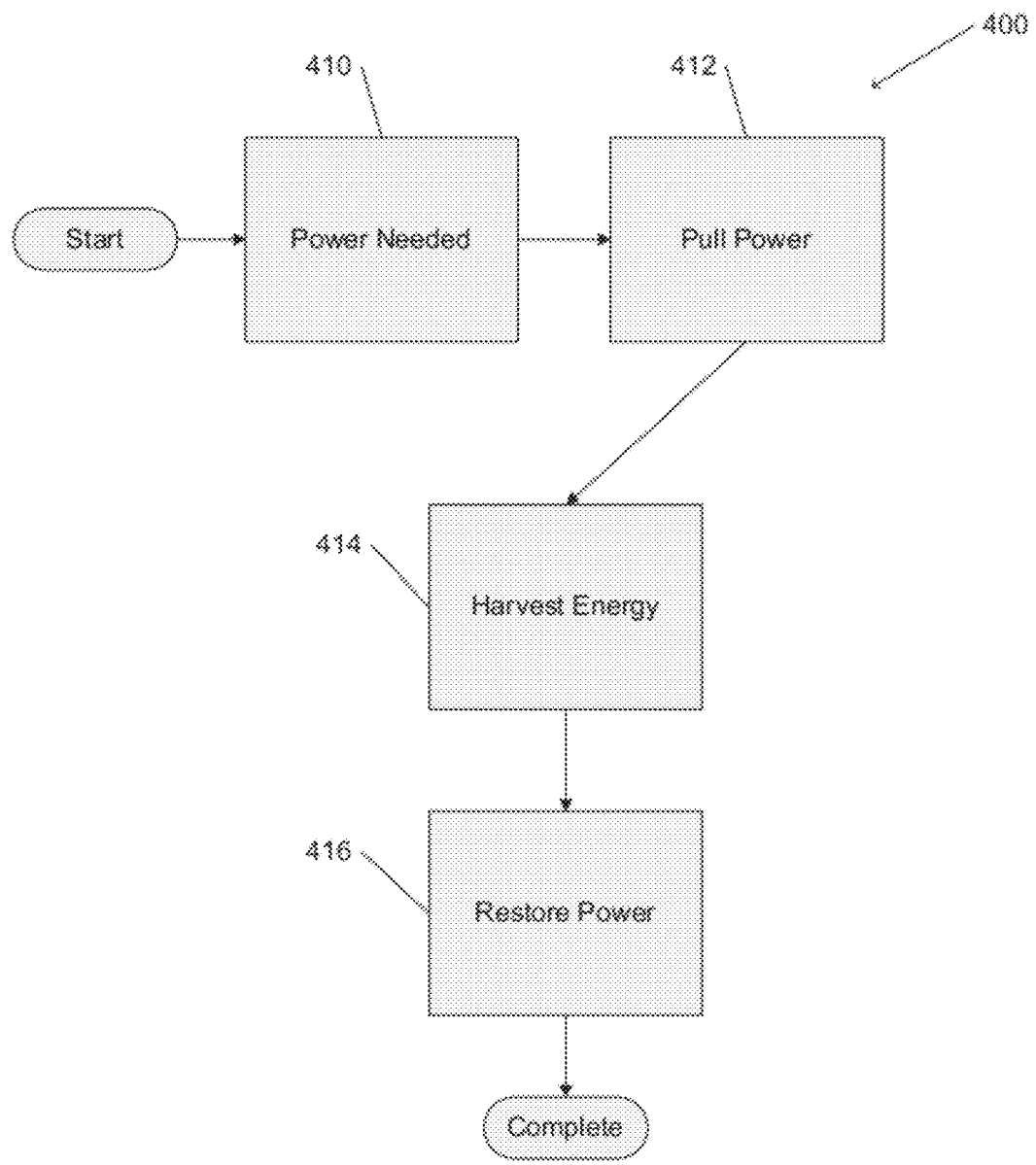
FIG. 4 is a flow chart illustrating a process for harvesting energy in accordance with an embodiment of the invention.

In many embodiments of the invention, the remote sensor platform utilizes power from a power supply module to operate. A process for performing energy harvesting in accordance with an embodiment of the invention is illustrated in FIG. 4. The energy harvesting process 400 may begin with a need 410 for power. In a number of embodiments, the energy harvesting process begins without a need for power. The remote sensor platform pulls (412) power from the power supply module. In many embodiments of the invention, the power supply module harvests (414) energy. In several embodiments of the invention, the power supply module harvests energy without any previous need for power. The harvested energy is used to restore (416) the power used to the power supply module. In many embodiments of the invention, the harvested energy is used directly by the remote sensor platform.

Although a specific process for performing energy harvesting in accordance with an embodiment of the invention is discussed above, any of a variety of energy harvesting processes can be utilized in order to power the remote sensor platform in accordance with embodiments of the invention. Processes for receiving and processing data in accordance with embodiments of the invention are discussed below.

Receiving and Processing Data

Figure 5:
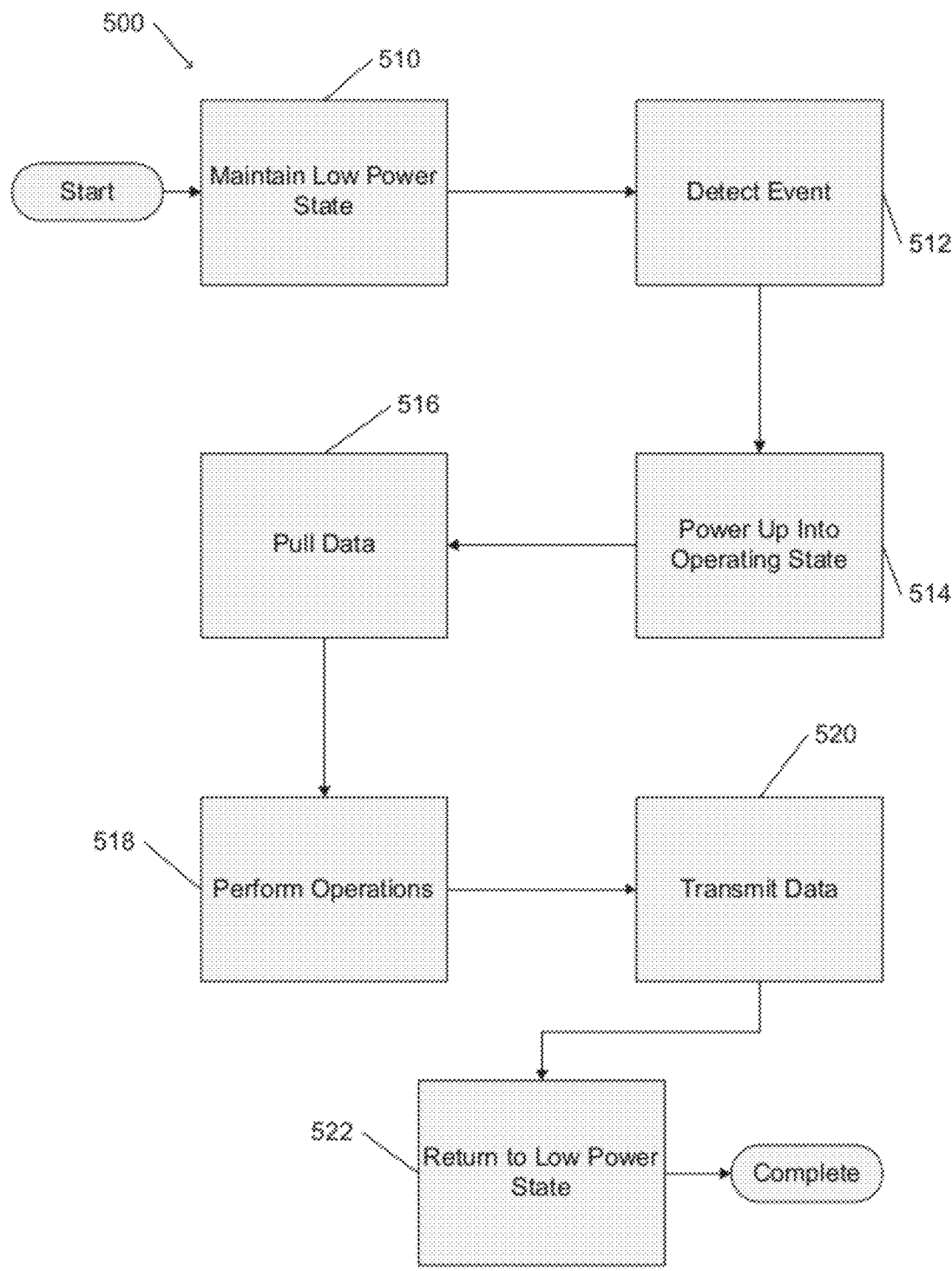
FIG. 5 is a flow chart illustrating a process for receiving and processing data in accordance with an embodiment of the invention.

A process for receiving and processing data in accordance with an embodiment of the invention is shown in FIG. 5. The process 500 for receiving and processing data includes the remote sensor platform being in a low power state 510. The remote sensor platform detects (512) an event. In a number of embodiments of the invention, the event is generated by a sensor module. In many embodiments of the invention, events such as a timed event, data received via the radio module, or externally provided data are detected. The remote sensor platform powers up (514) into an operating state.

In many embodiments of the invention, entering the operating state involves waking a FPGA from a low power mode and having the FPGA retrieve data from a data source. In several embodiments of the invention, entering the operating state also involves powering up a radio module. The FPGA can retrieve data from a sensor module or receive data transmitted from a communications platform via the radio module. In several embodiments of the invention, the data is pushed to the FPGA. In a number of embodiments of the invention, the retrieval of data is time-dependent.

Once the data is retrieved, the remote sensor platform performs (518) operations on the data. In many embodiments of the invention, a FPGA is used to perform operations on the data. Once the data is retrieved, the remote sensor platform may transmit (520) the data. In a number of embodiments of the invention, a remote sensor platform uses a radio module to transmit the data. In several embodiments of the invention, the remote sensor module returns (522) to a low power state. In many embodiments of the invention, the return to a low power state involves moving a FPGA into a low power state. In a number of embodiments of the invention, the low power state involves powering down a radio module.

Although a specific process for receiving and processing data in accordance with an embodiment of the invention is discussed above, any of a variety of data sensing processes can be utilized in order to provide data to remote sensor platform in accordance with embodiments of the invention. Processes for transmitting the data in accordance with embodiments of the invention are discussed below.

Transmission of Data

Figure 6:
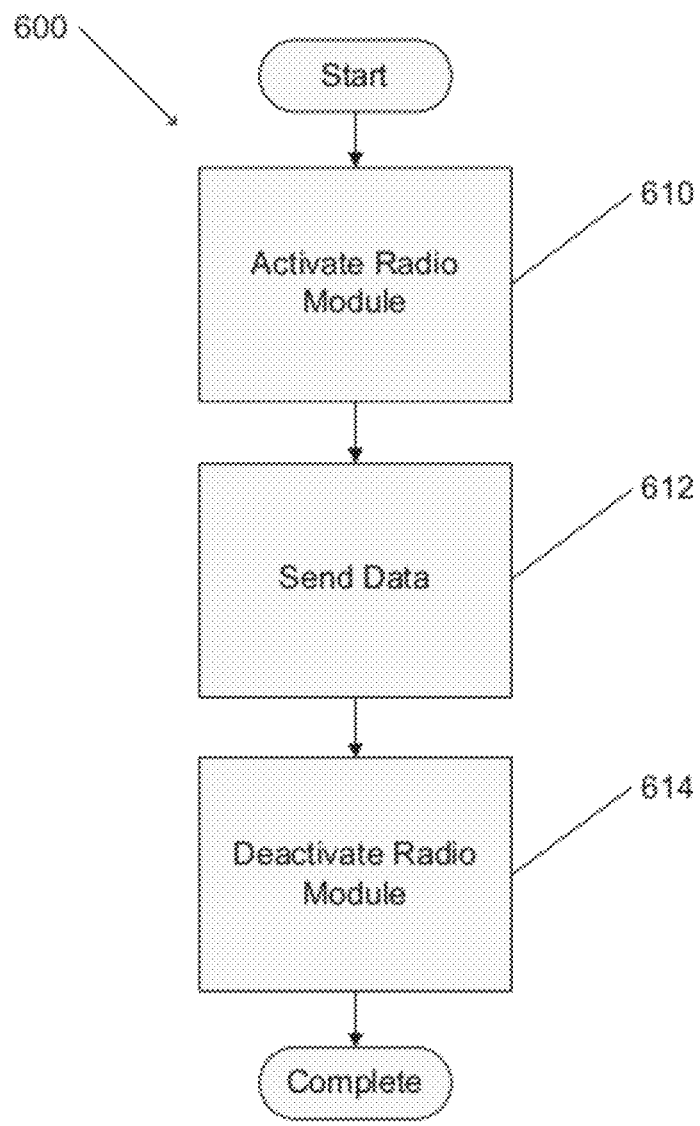
FIG. 6 is a flow chart illustrating a process for transmitting data in accordance with an embodiment of the invention.

A process for transmitting data using a radio module in a sensor platform in accordance with an embodiment of the invention is shown in FIG. 6. In many embodiments of the invention, the radio module is in a low power or off state. In several embodiments of the invention, the transmission process 600 involves activating the radio module and transmitting (612) the data to a remote device. In a number of embodiments, the radio module is implemented on an FPGA and the data is provided to the radio module by other circuitry on the FPGA. In several embodiments of the invention, the data is transmitted on a predefined frequency. In many embodiments of the invention, the data is transmitted on a range of frequencies. In a number of embodiments of the invention, the data is transmitted in an unsecure manner. In many embodiments of the invention, the data is transmitted in a secure manner. In many embodiments of the invention, following transmission the radio module is deactivated (614). In several embodiments of the invention, the radio module is switched off. In a number of embodiments of the invention, the radio module is put into a low power state.

Although a specific process for transmitting data in accordance with an embodiment of the invention is discussed above, any of a variety of transmission processes can be utilized in order to provide data to remote sensor platform in accordance with embodiments of the invention.

Several systems and methods for power management, data collection, data processing, and data transmission are discussed above. Similar systems and methods may be utilized on the remote sensor platform, the communication platform, and other associated devices.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive.

What is claimed:

1. A low power communication device, comprising:
a processing circuitry implemented using an FPGA comprising a set of 2T flash cells capable of operating at a temperature of −85 degrees Celsius;
a radio module capable of transmitting and receiving data;
a power supply module capable of providing power to the processing circuitry and the radio module, wherein the power supply module comprises:
an ultracapacitor that uses layers of a single substrate to form virtual plates, said ultracapacitor capable of operating at a temperature of −85 degrees Celsius; and
an energy harvesting unit connected to the ultracapacitor, wherein the ultracapacitor stores power collected using the energy harvesting unit;
a sensor module including at least one sensor that is capable of detecting environmental data;
wherein the processing circuitry is configured to initiate a power up sequence from a low power operating mode in response to detection of an event, retrieve the environmental data, process the environmental data, and transmit the environmental data;

wherein the power required to operate the processing circuitry does not exceed the power generated by the power supply module; and wherein the low power communication device is capable of processing, transmitting and receiving data at a temperature of −85 degrees Celsius.

2. The low power communications device of claim 1, wherein the ultracapacitor is capable of operation at a temperature of −200 degrees Celsius.

3. The low power communication device of claim 1, wherein energy harvesting unit can harvest photovoltaic energy.

4. The low power communication device of claim 1, wherein the energy harvesting unit can harvest piezoelectric energy.

5. The low power communication device of claim 1, wherein the energy harvesting unit can harvest thermal gradient energy.

6. The low power communication device of claim 1, wherein the energy harvesting unit can harvest RF energy.

7. The low power communication device of claim 1, wherein the power supply module further comprises a battery that is used to power the ultracapacitor.

8. The low power communication device of claim 7, wherein the battery is a Lithium-Ion battery.

9. The lower power communication device of claim 1, wherein the radio module is implemented utilizing the processing circuitry.

10. A method for operating low power communication devices in a local environment, comprising:
    harvesting energy from the local environment using an energy harvesting module;
    charging an ultracapacitor that uses layers of a single substrate to form virtual plates, said ultracapacitor capable of operating at −85 degrees Celsius, where charging the ultracapacitor utilizes the harvested energy;
    detecting environmental data using a sensor module including at least one sensor;
    powering a low power communications device by initiating a power up sequence from a low power operating mode in response to detection of an event;
    retrieving the environmental data;
    processing the environmental data; and
    transmitting the environmental data, wherein the low power communications device is at least partially implemented using an FPGA comprising a set of 2T flash cells and is capable of processing, transmitting and receiving data at a temperature of −85 degrees Celsius.

11. The method of claim 10, wherein transmitting the environmental data further comprises transmitting the environmental data using a radio module, wherein the radio module is implemented using Silicon Germanium circuitry capable of operating at −85 degrees Celsius.

12. The method of claim 10, wherein processing the environmental data comprises power management of a processing circuit that is implemented using an FPGA comprising a set of 2T flash cells capable of operating at a temperature of −85 degrees Celsius.

13. The method of claim 10, wherein transmitting the environmental data comprises power management of a radio module.

14. The method of claim 10, wherein the energy harvesting occurs continuously.

15. The method of claim 10, wherein the energy harvesting occurs on demand.

16. The low power communication device of claim 1, wherein the sensor module is reconfigurable.

17. The low power communication device of claim 1, wherein the low power communication device can transmit data to a second lower power communication device using the radio module.

18. The low power communication device of claim 1, wherein the low power communication device can receive data from a second lower power communication device using the radio module.

19. The low power communication device of claim 1, wherein:
    the low power communication device communicates with a communications platform; and
    the communications platform is able to navigate an environment.

20. The low power communication device of claim 7, wherein the battery stores excess power collected by the energy harvesting unit.

21. The low power communication device of claim 20, wherein the battery provides power to the processing circuitry and the radio module when the ultracapacitor is discharged.

22. The low power communication device of claim 20, wherein the battery provides power to recharge the ultracapacitor.

* * * * *